S. A. THOMPSON.
TYPE WRITER.
APPLICATION FILED MAY 20, 1914.

1,138,427.

Patented May 4, 1915.
2 SHEETS—SHEET 1.

WITNESSES
Frank C. Palmer
J. L. McAuliffe

INVENTOR
Samuel A. Thompson
BY Munn & Co
ATTORNEYS

S. A. THOMPSON.
TYPE WRITER.
APPLICATION FILED MAY 20, 1914.
1,138,427. Patented May 4, 1915.
2 SHEETS—SHEET 2.
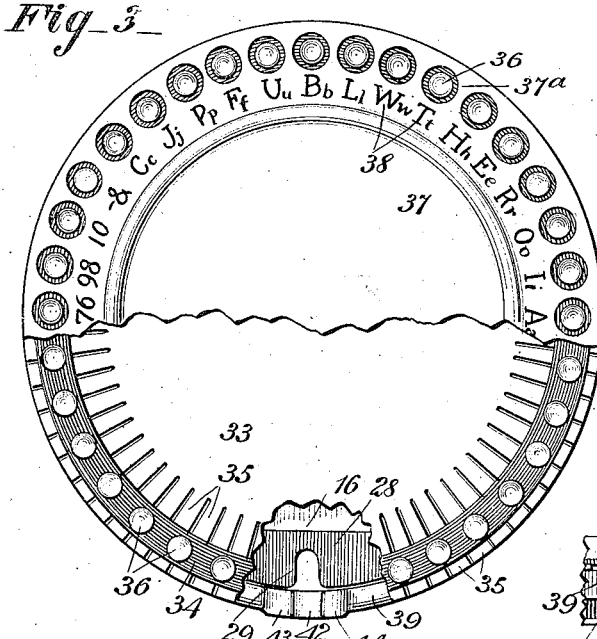
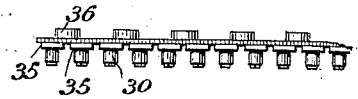
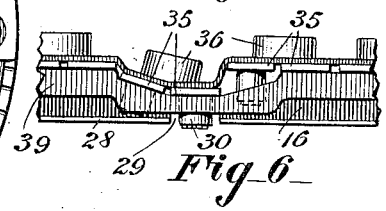
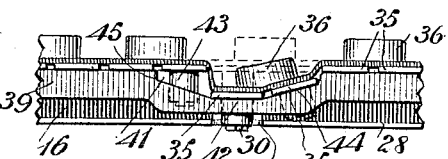
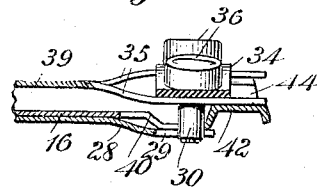
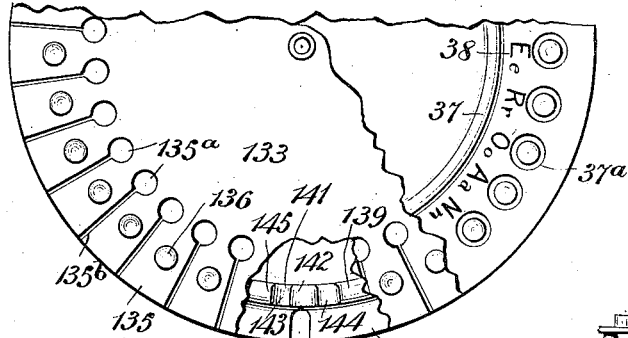
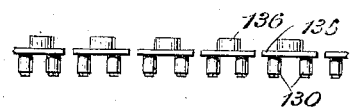
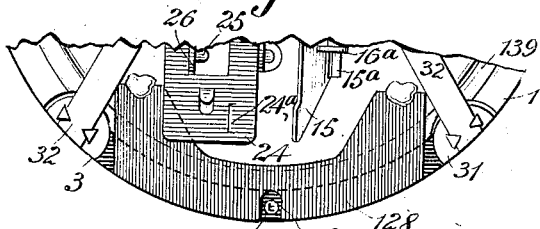
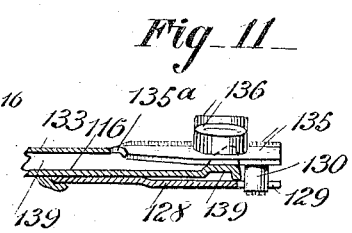
WITNESSES
Frank L. Palmer
L. M. Auliffe
INVENTOR
Samuel A. Thompson
by Munn & Co
ATTORNEYS

UNITED STATES PATENT OFFICE.

SAMUEL ALEXANDER THOMPSON, OF NEW YORK, N. Y.

TYPE-WRITER.

1,138,424.

Specification of Letters Patent.   Patented May 4, 1915.

Application filed May 20, 1914.   Serial No. 839,774.

*To all whom it may concern:*

Be it known that I, SAMUEL A. THOMPSON, a citizen of the United States, and a resident of the city of New York, borough of Manhattan, in the county and State of New York, have invented a new and Improved Type-Writer, of which the following is a full, clear, and exact description.

My invention relates to typewriter machines in which a printing structure, preferably in the form of a wheel is employed, the same being provided with fingers carrying the printing types on a face thereof. In the case of a wheel or similar printing structure mounted to turn the fingers are radial or essentially so. The printing structure is mounted on a frame for movement in its own plane for locating a type at the printing point, and the frame is movable relatively to the platen of the typewriter for printing. In the case of a wheel or the like, the frame may be adapted to be swung upwardly away from the platen, usually a roll platen, when desired for examining the typewritten matter, or for the insertion or removal of the paper.

The present invention provides type-carrying members on which the printing type are arranged in pairs, comprising, for instance, an upper and a lower case letter, and the structure is provided with a depression or notch of such a character as to provide for the depression of the two types of a pair into the notch below the general plane of movement of the printing structure. There is furthermore, provision made for a lateral play of a pair of type in the notch either to the right or left to position either one of the types of the pair for printing and for permitting the selected type to be impressed on the paper by a relative movement of the printing structure and platen one toward the other, to effect the printing contact.

The invention will be particularly explained in the specific description following.

Reference is to be had to the accompanying drawings forming a part of this specification, in which similar characters of reference indicate corresponding parts in all the views.

Figure 1:
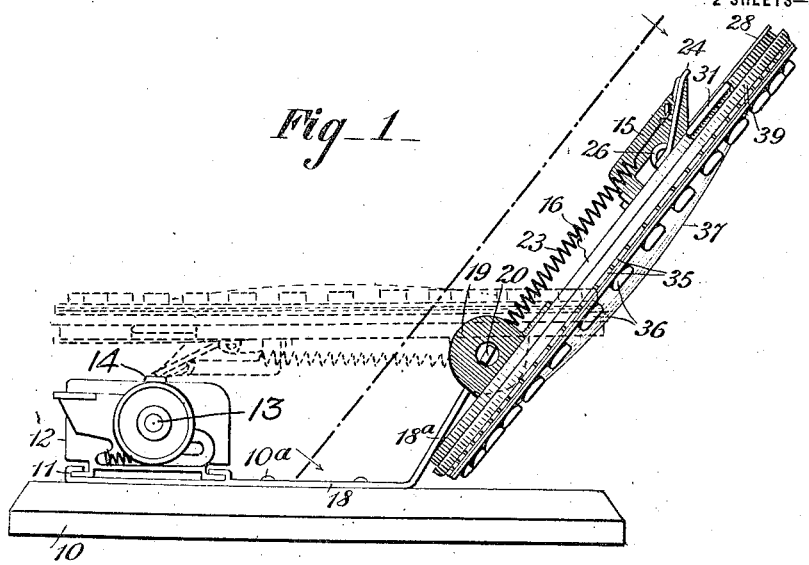
Figure 2:
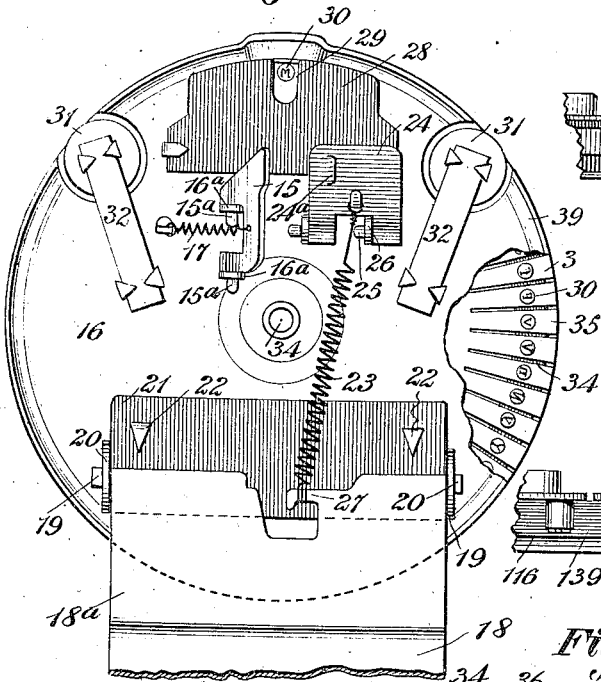
Figure 13:
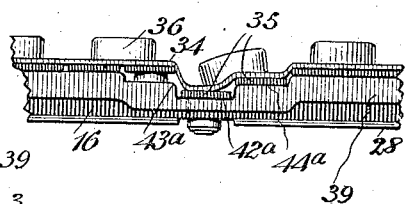
Figure 12:
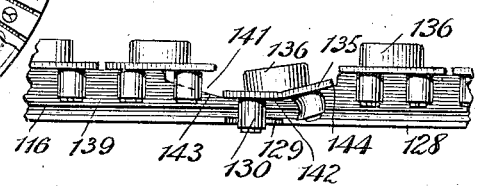
Figure 14:
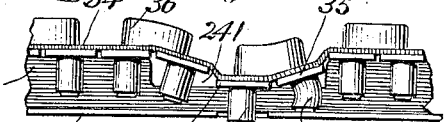

Figure 1 is a side elevation of a typewriter embodying my invention, the printing structure being illustrated in the form of a wheel which is shown as swung to the raised position away from the platen; Fig. 2 is a front view as indicated by the arrows in Fig. 1; Fig. 3 is a plan view of the printing wheel and its support and appurtenances, parts being broken away; Fig. 4 is a fragmentary edge view showing a portion of the printing wheel; Fig. 5 is a fragmentary front view on a larger scale, of the parts shown in Fig. 3, showing the position of the type-carrying fingers when the right hand type of a pair is in printing position; Fig. 6 is a view similar to Fig. 5, but indicating the left hand type of a pair when in printing position; Fig. 7 is a vertical section of the parts shown in Fig. 6; Fig. 8 is a fragmentary plan view similar to Fig. 3, but showing a modification; Fig. 9 is a fragmentary inverted plan view of the parts shown in Fig. 8; Fig. 10 is a view similar to Fig. 4, but illustrating the type-carrying fingers of the form shown in Fig. 8; Fig. 11 is a view similar to Fig. 7, showing type-carrying fingers of the form shown in Fig. 10; Fig. 12 is a front view similar to Fig. 6, but illustrating the modified type-carrying fingers; Fig. 13 is a view similar to Fig. 12, the type-carrying fingers being as shown in Figs. 1 to 7, the supporting frame for the type wheel being slightly modified; and Fig. 14 is a view similar to Fig. 13, but showing a further modification.

I have illustrated my invention as embodied in a printing structure in the form of a wheel or rotary element.

In machines of the class to which the invention relates, either the printing structure or the platen, usually a roll platen, is caused to travel by the depression of the said wheel in printing. Moreover, as is well known, a relative movement of the platen and the carriage with the printing structure one toward the other, is produced for effecting the impression. In the example given the printing structure is depressible toward the platen for producing the impression, after a shifting and locating movement of the said structure. The printing structure, in this instance mounted to turn and generically referred to hereinafter as a wheel, is in fixed location, while the platen is arranged to travel. In constructing the illustrated embodiment, any suitable base 10 is provided, having a track or guide 11 on which the carriage 12 has guided movement and is provided with a roll platen 13. The carriage 12 has the usual form of longitudinal rack 14, to be engaged by the feed pawl 15 on the rockable frame 16, here shown as a disk which supports the printing wheel, as hereinafter explained. The said pawl is shown as pivotally mounted by pivot lugs 15ª thereon, which are received in ears 16ª of the frame or disk 16, and is under the influence of a retractile spring 17.

The frame 16 is rockably mounted on the upwardly projecting rear end 18ª of a plate 18, which is secured to the base 10 by any suitable fastener 10ª. A track or guide 11 is formed integrally with the said plate 18. The pivotal connection with the frame 16 may be effected, as shown, by means of pivot plugs 19 projecting laterally from the end 18ª of the plate 18, which are received in ears 20 on a plate 21 secured to the frame 16 in any suitable manner, as by tongues 22. By the described construction, when the frame 16, with the printing wheel is in the normal position as indicated in dotted lines, Fig. 1, for operation, the depression of the said frame for printing will cause the pawl 15 to engage the rack 14, and thereby feed the carriage 12 in the well known manner.

In order to lift the carriage, a retractile spring 23 is provided, connected at one end with a yielding member 24, preferably in the form of a plate which is pivoted by lugs 25 to ears 26 on the frame 16 adjacent to the pawl 15, so as to bear on the rack 14. The opposite end of the said spring 23 is connected with an arm 27 on the upper end 18ª of the fixed plate 18, and is under tension so that it tends to exert friction between the pivot members 19, 20, whereby to prevent side play of the frame 16 of the printing wheel, and thereby secure proper alinement in printing. When the frame 16 is depressed below the normal position indicated in dotted lines (Fig. 1) for effecting an impress of the type in the well known manner of these machines, the plate 24 and spring 23 will yield to the downward pressure, thus placing the said spring 23 under additional tension at the time of printing, to increase the friction on the pivot members 19, 20, and produce the necessary reaction to lift the frame 16 and the type wheel from the depressed or printing position. The plate 24 may have a tooth 24ª struck up from the same, to engage the teeth of the rack 14 employed in this type of machine, and thereby tend to hold the parts in proper position.

As will be seen from Fig. 1, the frame 16, with the printing device will be maintained in the raised inoperative position by the spring 23, since the point of connection of the said spring with the swinging structure is carried rearwardly of the pivots 19 as the said structure is swung to the raised rearward position.

At the under side of the frame 16 a guard 28 is provided to prevent contact of any type but the one with which the impression is to be made, said guard plate having an opening 29, as best seen in Fig. 7, through which the type 30 is depressed for printing. At either side of the opening 29 an inking pad 31 is supported on an arm 32, so that as the type 30 approaches the opening 29 from either direction, the type will be inked.

The type 30 are of rubber carried on a type wheel 33. Preferably the rubber type are integral with a rubber annulus 34, which extends over the radial fingers 35. Each type extends vertically through a corresponding opening in a finger 35, and thus the type and the annulus 34 are vulcanized to the fingers. Keys 36, in the form of protuberances are also formed integrally with the rubber type and annulus, and project from the upper side of said annulus; each key 36 is common to a pair of type-carrying fingers 35, and the fingers 35 of a pair carry respectively an upper and a lower case letter, or two otherwise dissimilar characters. An index of the characters consists, in the example shown in Fig. 3, of an index plate or disk 37, which lies on top of the printing wheel 33 and bears index characters 38 corresponding with the keys 36, said keys projecting through holes 37ª in the index plate, and as will be seen from Fig. 3, the index to each key 36 will consist of an upper and lower case letter or two otherwise dissimilar characters such as the numerals 8, 9, for example.

The frame or disk 16 adjacent to the edge is formed with a corrugation 39, thereby elevating the corrugated portion above the general plane of the frame, and the fingers 35 rest on said corrugation. An opening 40 in the disk 16, at the front, is in register with the opening 29, to permit a type 30 to be depressed.

Each key 36 will serve to depress either of the characters of a pair, for effecting an impression of either character, for which purpose a notch or depression 41 is formed in the elevated portion 39 adjacent to the openings 29, 40, and extending laterally at both sides of said openings, as seen clearly in Figs. 5 and 6. The bottom surface of the depression 41 includes a central plane 42 and side planes 43, 44, at the left and right of the central plane. The effect is, that the central portion, as defined by the plane 42 or equivalent formation, is at such an elevation as to cause a type 30 to project through the openings 29 and 40 when the finger carrying said type is located at the said central portion 42 of the notch. The width of the notch 41 is equal to or slightly greater than the aggregate width of three fingers 35, so that two fingers may be vibrated laterally in the notch to dispose either finger centrally of the notch, with its type in register with the openings 29, 40, and dispose the other finger of the pair to the right or left of the central portion. The finger carrying that type to the right or left will be sustained by the surface 43 or 44, and the type thereof will be above the guard 28 and prevented by the latter from making an impression. Thus the single key 36 will, through the aid of the index characters 38, position both type of a pair at the notch 41, and the key then is caused to oscillate the type wheel to the right or left of the notch according as one or the other of the printing characters of the pair are to be impressed. The end walls 45 of the notch limit the oscillating movement of the wheel after the types have been depressed into said notch.

Referring particularly to Figs. 8 to 12, the base frame or disk 16 is provided with a printing wheel 133 having radial fingers 135 at the periphery, each of which fingers is provided with a pair of types 130. Each of these fingers 135 is capable of torsional deformation to impress either printing type of the pair carried by the unitary finger in lieu of the independently depressible separate fingers 35 for the types on a pair. The annular bead or the raised surface presented by the corrugation 139, in the modified form is at the inside of the type opening 129 in the guard 128, instead of outside the type opening as in the first described construction (compare Figs. 7 and 11). The corrugation has a depression 141 presenting the elements 142 to 145 corresponding in all respects with the similar elements 42 to 45. At the base of the fingers 135 the printing wheel 136 is formed with openings 135ª complementary to the slits 135ᵇ between the fingers, whereby the base of each finger is given reduced width and thus weakened. Keys 136 are provided, which may be of rubber, but the rubber annulus 34 in the previous construction may be, and preferably is omitted, since the inherent resiliency of the comparatively large fingers serves to restore the fingers to the normal form and position after deformation. Upon a finger 135 being located in the notch 141, the said finger may be shifted to the right or left to locate either the right or left type 130 at the depressed central portion 142 and in register with the opening 129 of the guard 128. The arrest of one edge portion by the surface 143 or 144 as the finger is depressed, and the further depression of the opposite edge portion of the finger carrying the type to be depressed, will result in a torsional deformation of the finger so that it will conform to the depressed horizontal surface 142 and an adjacent surface 143 or 144, (see Fig. 12).

I have shown the surfaces 43, 44 and the corresponding surfaces 143, 144, inclined in the constructions illustrated in Figs. 1 to 12, but the three bottom surfaces presented by the notch may be in horizontal planes as in Fig. 13, in which the central depressed surface 42ª is in one horizontal plane, and the raised surfaces 43ª, 44ª are in a common horizontal plane above. It is to be understood that in this form of the invention the other elements shown in Fig. 13, correspond in all respects with the same elements in Figs. 1 to 7.

The index plate 37 in the form shown in Figs. 8 to 13, the index characters 38, and the openings 37ª for the keys, are the same as in the first described construction.

The differential bottom surface of the notch is very effective in positively limiting the downward movement of one type of a pair relatively to its companion, after the type to be impressed has been positioned by a proper oscillation of the two type to the right or left, and is of great practical value; but it is possible to obtain measurably good results by relying partly or wholly upon the resiliency of the guard beneath to restrain the one type of the pair, while permitting the other type to protrude below the opening in the guard for printing. The resiliency of the guard will cause it to yield upwardly in contacting with the printing surface, and will deform or bodily hold back the companion type in the notch.

I have illustrated in Fig. 14, a notch 241 in the support 216, in which the bottom of the notch is in a single plane. In this case the resilient guard 228, which is similar to the guards 28 and 128, is relied upon to yield upwardly and permit the one type of a pair to move relatively downward and project below the guard, while the latter holds back or deforms the companion type of the pair.

Having thus described my invention, I claim as new and desire to secure by Letters Patent:

1. In a typewriter, a rockably mounted frame, a wheel mounted on the frame to turn in its own plane, radial, type-carrying means on the wheel, and types in pairs on the said radial means, the frame presenting a depression accommodating the radial means pertaining to a pair of types and permitting a limited oscillation of the wheel, the central portion of the depression being lower than the side portions and accommodating the radial means pertaining to either type of a pair in a position depressed below the means pertaining to the other type of the pair.

2. In a typewriter, a wheel having a series of radial fingers forming type-carrying means, types on said fingers, and a rockable support on which the wheel is mounted to turn in its own plane, said support having a depressed notch accommodating in depressed position the type-carrying means pertaining to a pair of types, and affording space for limited oscillation of said depressed means to either side of said notch, the said notch furthermore presenting a bottom surface depressed at the center below the side portions, and the said central portion accommodating the type-carrying means pertaining to one type.

3. In a typewriter, a wheel mounted to turn in its own plane and to rock downwardly, type arranged in pairs, means on the wheel carrying said types, and means rockable with the wheel and presenting a depressed notch into which the type-carrying means for a pair of types may be depressed, the central portion of the notch being depressed beyond the side portions and accommodating the type-carrying means pertaining to a single type of a pair.

4. In a typewriter of the character described, a rockable support, a member mounted on said support to rock therewith and to turn in its own plane, depressible type-carrying means on said member, type on said carrying means, said support presenting a depressed notch below the type-carrying means, permitting the depression of the carrying means pertaining to two adjacent types and affording space for the oscillation of said depressed means toward either end of the notch, and a guard below the notch having an opening adjacent to the central portion of the notch, the opening permitting a single type only to be depressed therethrough.

5. In a typewriter of the character described, a rockable support, a member mounted on said support to rock therewith and to turn in its own plane, depressible type-carrying means on said member, type on said carrying means, said support presenting a depressed notch below the type-carrying means permitting the depression of the carrying means pertaining to two adjacent types, and affording space for the oscillation of said depressed means toward either end of the notch, and a guard below the notch, having an opening adjacent to the central portion of the notch, the opening permitting a single type only to be depressed therethrough, the said notch furthermore presenting a differential bottom surface.

6. In a typewriter, a support mounted to rock downwardly, a member mounted to turn in its own plane and to rock with the support, type-carrying means on said member, and type on said type-carrying means, the said support presenting a depressed notch permitting a depression of the carrying means of two adjacent types and a limited oscillation of said depressed means in said notch.

7. In a typewriter, a support mounted to rock downwardly, a member mounted to turn in its own plane and to rock with the said support, type-carrying means on said member, and type on said type-carrying means, the said support presenting a depressed notch permitting a depression of the carrying means of two adjacent type and a limited oscillation of said depressed means in said notch, the notch furthermore having a differential bottom surface permitting unequal depression of the carrying means of the respective types of a pair.

8. In a typewriter, a revoluble and depressible member having type-carrying means relatively depressible below the plane of the said member and bodily depressible with the said member, and a member depressible with the said first member and presenting a differential notch adapted to receive the type-carrying means pertaining to two adjacent types and permit lateral oscillation of the said depressed means in the notch.

9. In a typewriter, a revoluble and depressible member having type-carrying means relatively depressible below the plane of the said member and bodily depressible with the said member, and a member depressible with the said first member and presenting a differential notch adapted to receive the type-carrying means pertaining to two adjacent types and permit lateral oscillation of the said depressed means in the notch, the notch furthermore having a bottom surface depressed at the center below the side portion and said side portions being inclined.

10. In a typewriter of the character described, a revoluble and depressible member having type-carrying means relatively depressible below the said member and bodily depressible with the said member, a support depressible with the said first member and presenting a differential notch adapted to receive the type-carrying means pertaining to two types and permit lateral oscillation of the said depressed means in the notch, and a guard beneath the notch permitting the depression therethrough of one type.

11. In a typewriter, a platen, and a printing structure, the one having traveling movement relatively to the other and also a relative movement toward and from the other, said printing structure having means carrying printing type arranged in pairs, and a member presenting a locating notch to receive said means carrying the type of a pair, the said notch permitting a lateral play therein of the said means to locate either type of the pair in printing position.

12. In a typewriter, a platen, a printing structure shiftable in its own plane relatively to the platen and having a relative movement toward and from the platen, means on the printing structure carrying types in pairs, and a member movable with the printing structure and presenting a depression to accommodate the type carrying means having a pair of type, the type of a pair having a relative movement to position either type for printing.

In testimony whereof I have signed my name to this specification in the presence of two subscribing witnesses.

SAMUEL ALEXANDER THOMPSON.

Witnesses:
FREDERICK E. BARNES,
DAVID J. DE CLARK.